United States Patent [19]
Niggemann et al.

[11] Patent Number: 5,828,148
[45] Date of Patent: Oct. 27, 1998

[54] METHOD AND APPARATUS FOR REDUCING WINDAGE LOSSES IN ROTATING EQUIPMENT AND ELECTRIC MOTOR/GENERATOR EMPLOYING SAME

[75] Inventors: Richard E. Niggemann; Scott M. Thomson; Michael G. Schneider, all of Rockford, Ill.

[73] Assignee: Sundstrand Corporation, Rockford, Ill.

[21] Appl. No.: 821,143

[22] Filed: Mar. 20, 1997

[51] Int. Cl.⁶ .......................................................... H02K 5/00
[52] U.S. Cl. .............................. 310/86; 384/901; 384/107
[58] Field of Search ................................... 384/901, 112, 384/114, 123; 310/86, 90

[56] References Cited

U.S. PATENT DOCUMENTS

| | | | |
|---|---|---|---|
| 2,972,308 | 2/1961 | Haggerty | 310/86 |
| 3,229,120 | 1/1966 | Drouard | 310/86 |
| 3,487,457 | 12/1969 | Bird | 310/86 |
| 3,669,514 | 6/1972 | Wada et al. | 384/114 |
| 3,837,716 | 9/1974 | Allen et al. | 384/123 |
| 3,891,282 | 6/1975 | Tuffias | 384/123 |
| 4,311,932 | 1/1982 | Olson | 310/61 |
| 4,371,219 | 2/1983 | Yamane | 384/291 |
| 4,409,502 | 10/1983 | McCabria | 310/56 |
| 4,496,862 | 1/1985 | Weber | 310/61 |
| 4,513,218 | 4/1985 | Hansen | 310/270 |
| 4,514,652 | 4/1985 | Olson | 310/61 |
| 4,517,479 | 5/1985 | Aleem et al. | 310/54 |
| 4,600,848 | 7/1986 | Sutrina et al. | 310/54 |
| 4,611,137 | 9/1986 | Sutrina | 310/54 |
| 4,647,805 | 3/1987 | Flygare et al. | 310/61 |
| 4,896,064 | 1/1990 | Taiani | 310/92 |
| 5,056,938 | 10/1991 | Ahlman et al. | 384/286 |
| 5,122,704 | 6/1992 | Blakeley et al. | 310/54 |

*Primary Examiner*—Clayton E. LaBalle
*Assistant Examiner*—B. Mullins
*Attorney, Agent, or Firm*—Jeffery J. Makeever

[57] ABSTRACT

A rotating flood cooled machine having reduced windage losses comprises a stator having an inner periphery and a rotor rotatably positioned within the stator separated from the stator by a gap which is filled with fluid. A film divider is rotatably positioned within this gap and is allowed to rotate freely. In such a machine, when the rotor rotates at a speed $\omega$, the film divider is caused to rotate at a speed of approximately $\omega/2$. At this speed, the film divider obtains a radial position during rotation of approximately midway between the outer periphery of the rotor and the inner periphery of the stator. This radial position is preferably maintained by the hydrodynamic bearing action of the fluid within the gap, or alternatively through the use of radial positioning or retaining mechanisms. The use of axial constraint mechanisms to maintain the film divider within the air gap under the shear forces of the fluid during operation is also contemplated. The film divider may also include a plurality of holes to facilitate a flow of fluid within the air gap. This flow may be further facilitated within and trough the air gap by dividing the film divider in two halves along a midline. A method of reducing the windage loss of a rotating flooded machine, such as, e.g., an electric motor or generator, comprises the steps of placing a film divider in the gap between the rotor and stator and allowing this divider to rotate freely therein during operation.

30 Claims, 12 Drawing Sheets

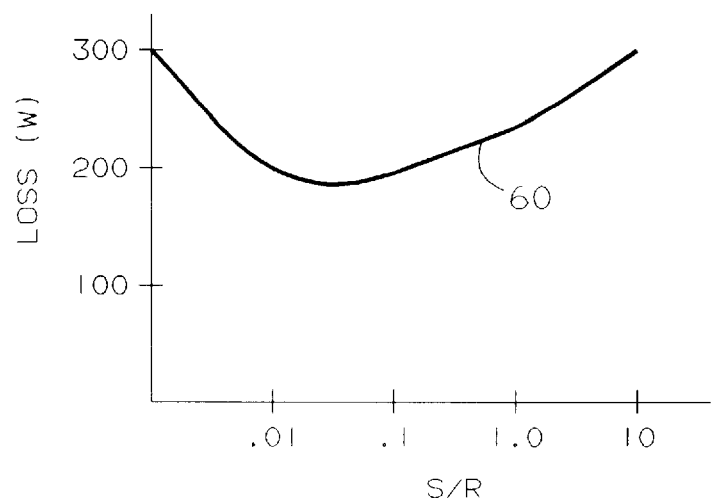
FIG. 12
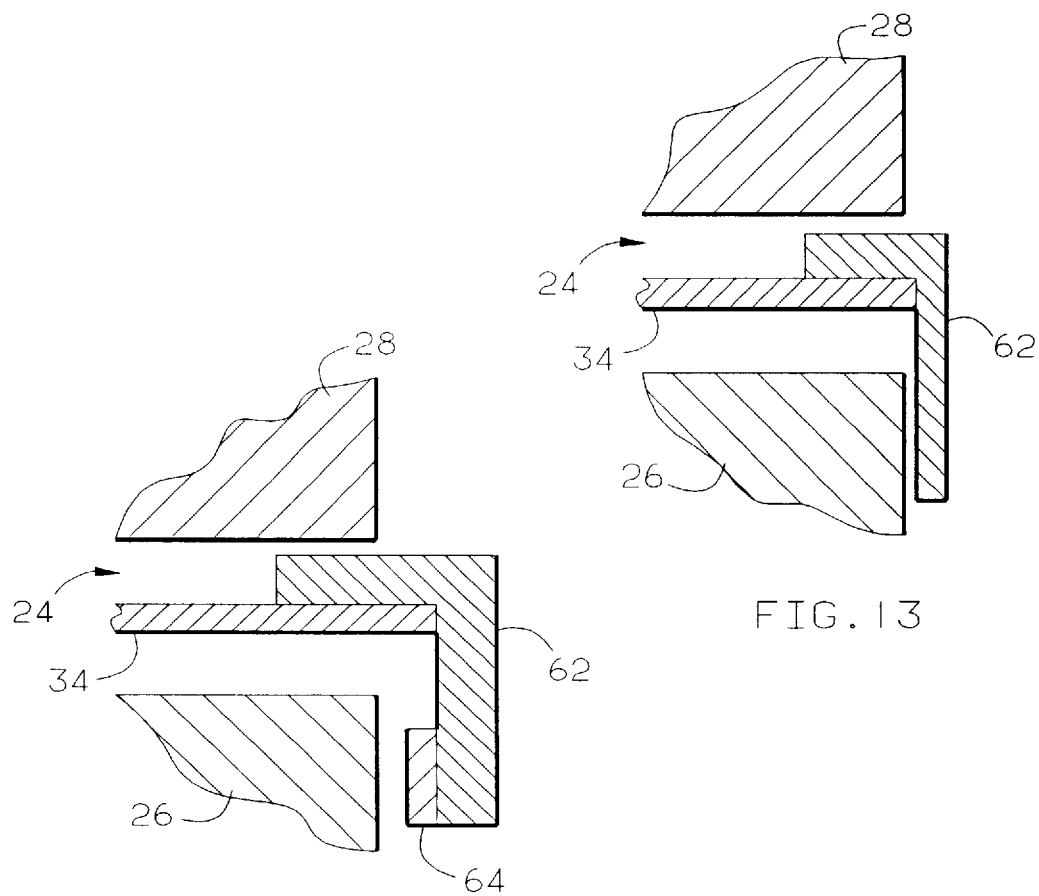
FIG. 13
FIG. 14

METHOD AND APPARATUS FOR REDUCING WINDAGE LOSSES IN ROTATING EQUIPMENT AND ELECTRIC MOTOR/GENERATOR EMPLOYING SAME

FIELD OF THE INVENTION

The present invention relates generally to rotating equipment including electric motors and generators, and more particularly to an apparatus a method for use with said rotating equipment for reducing the windage loss experienced thereby.

BACKGROUND ART

In both the aerospace and industrial markets the use of rotating equipment and electric motors and generators is increasing at a rapid pace both because of increased utilization requirements as replacements for other technology systems (e.g. replacement of mechanically driven pumps with electric motor driven pumps on the newest aircraft). While this transition to 'more electric' systems is generally viewed as a positive, increased energy costs in these markets in combination with the physical size and rating limitations of the machines and their driver electronics have inhibited a full realization of this technology. In an effort to limit the effects of these factors, engineers have designed lighter weight, higher speed, liquid cooled machines, and have pushed the envelope on electronic component capacity. Despite all of these efforts, however, engineers have had only marginal success in overcoming one of the single largest efficiency and rating limiting factors in rotating equipment use: windage loss.

Windage in a rotating electric machine is defined as the resisting influence of air (or other fluids) against the rotating armature of a dynamoelectric machine, creating a power loss. See THE RANDOM HOUSE DICTIONARY OF THE ENGLISH LANGUAGE 2177 (2nd ed. 1987). As may be seen from a review of FIG. 1, this windage power loss increases exponentially as a function of speed of the rotor (P $\alpha$ $\omega^{2.7}$). However, since modern 'more electric' system applications utilize high speed machines to reduce overall system weight and increase power density, the windage loss becomes excessive as illustrated by curve 20 of FIG. 1. These high speed machines are also typically physically smaller which, while a system advantage, may result in a smaller airgap between the rotor and stator. Unfortunately, it is known that a smaller airgap results in a higher windage loss. Additionally, since many of these high speed machines are of the flooded rotor type which utilize cooling fluid within the "air gap," windage loss is increased still further due to the increased drag of the higher density fluid as illustrated by the fluid velocity curve 22 across the air gap 24 between the rotor 26 and the stator 28 (see FIG. 2). This increased drag will tend to increase the temperature of the fluid within the airgap which may, without adequate axial fluid flow, result in fluid breakdown due to excessive heat build up. The excessive windage loss, therefore, effectively derates the machine capacity. This derating due to the total windage loss may consume over half of the available shaft power in the machine.

It is an objective of the instant invention, therefore, to overcome these and other problems existing in the art.

SUMMARY OF THE INVENTION

It is a principle objective of the instant invention to a new and improved apparatus and method to reduce windage loss in rotating machines including electric motors and generators. More particularly, it is an objective of the instant invention to provide a new and improved apparatus and method to reduce windage loss in a flooded rotor type rotating machine such as, for example, and electric motor or generator.

In a preferred embodiment of the instant invention, the apparatus comprises a stator having an inner periphery and a rotor rotatably positioned within the stator. The rotor has an outer periphery which, in conjunction with the inner periphery of the stator, defines the air gap therebetween. The preferred embodiment also contemplates a film divider which is rotatably positioned within the air gap. Ideally, the air gap is filled with a fluid. In such an embodiment, when the rotor rotates at a steady state speed $\omega$, the film divider is caused to rotate at a steady state speed of approximately $\omega/2$. At this steady state speed, the film divider obtains a steady state radial position during rotation of approximately midway between the outer periphery of the rotor and the inner periphery of the stator. This radial position is maintained in the preferred embodiment by hydrodynamic bearing action of the fluid within the air gap, or alternatively through the use of radial positioning or retaining mechanisms. The use of axial constraint mechanisms to maintain the film divider within the air gap under the shear forces of the fluid during operation is also contemplated by the instant invention. In an alternate embodiment of the instant invention, the film divider includes a plurality of holes to facilitate a flow of fluid within the air gap. To further facilitate the flow of fluid within and through the air gap, the film divider may be divided in two halves along a midline.

The preferred method of the instant invention to reduce windage loss in a flood cooled rotating machine such as that contemplated above and others, comprises the steps placing a film divider in the gap between the rotor and the stator and allowing the film divider to rotate freely in the gap during operation of the machine.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

FIG. 12 is a graphical illustration of the power loss curve versus the relationship between axial retention spacing from the rotor and rotor radius;

FIG. 13 is a partial view cross section of an embodiment of the instant invention illustrating an axial retention end cap;

FIG. 14 is a partial view cross section of an embodiment of the instant invention illustrating radial fins (standoff fins) on the axial retention end cap of FIG. 12;

DESCRIPTION OF THE PREFERRED EMBODIMENTS

Figure 3:
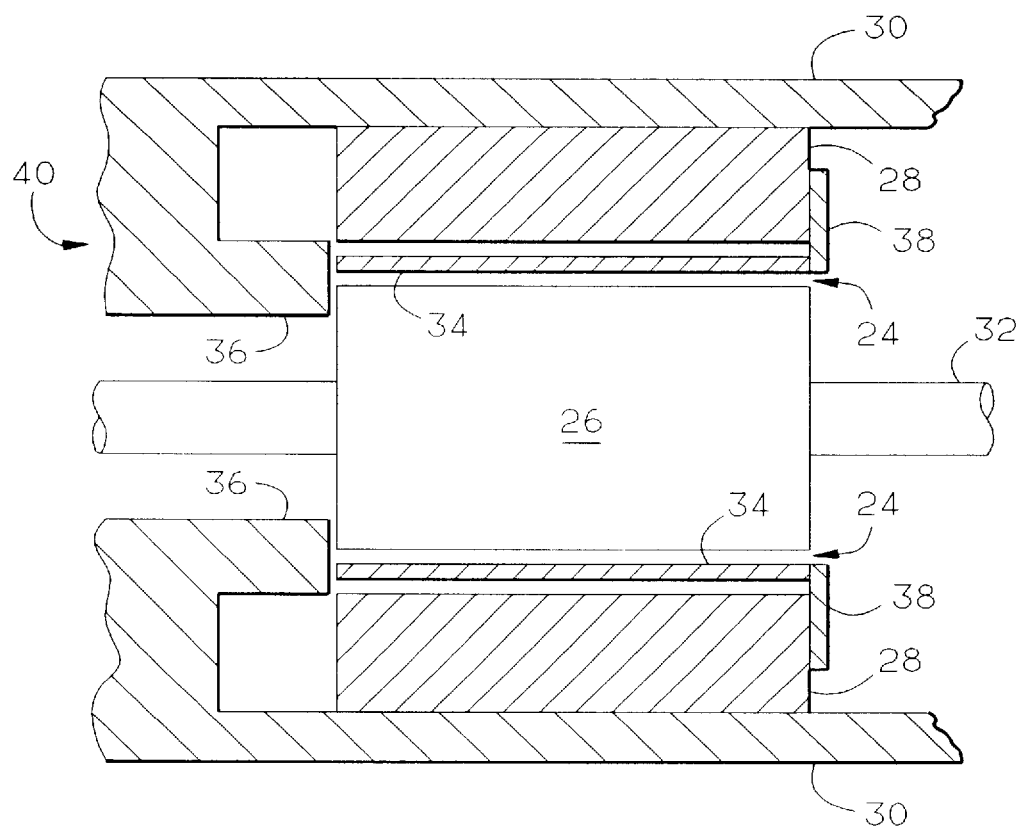
FIG. 3 is a cross section diagram of an embodiment of the instant invention.

A rotating machine 40 built in accordance with the teachings of the instant invention, an embodiment of which is illustrated in FIG. 3, comprises a stator 28 mounted within a housing 30, and a rotor 26 which is rotatably mounted within the stator 28. The rotor 26 is coupled to a shaft 32 which transfers rotational energy to and/or from the rotor 26. In a preferred embodiment of the instant invention, the machine 40 also includes a film divider 34 which is positioned within the gap 24 between the rotor 26 and the stator 28. This film divider 34 is freely rotatable within the gap 24. Axial retention within the gap 24 is provided by means, such as an axial constraint feature 36 integral with the housing 30, an axial constraint ring 38 attached to the stator 28, or other appropriate means as described hereinbelow and others known in the art.

Figure 1:
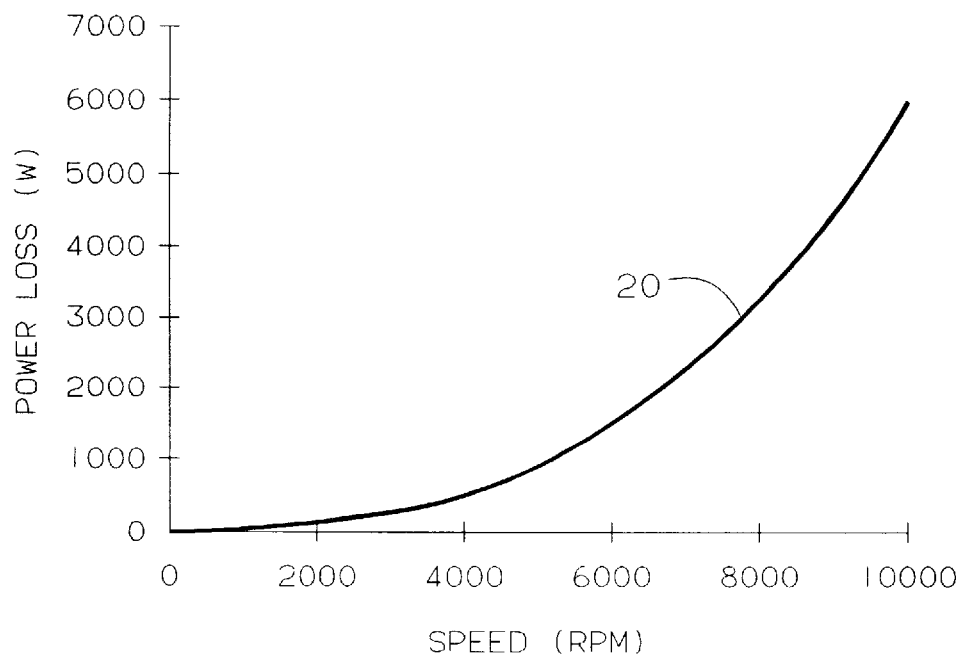
FIG. 1 graphically illustrates the power loss due to windage versus the speed of a machine built in accordance with the teachings of the prior art.

As the embodiment shown in FIG. 1 illustrates, the film divider 34 is concentric to both the rotor 26 and the stator 28. This film divider 34 is essentially a thin sleeve which may be made of any magnetically permeable material, such as, e.g., fiberglass/epoxy composite, or a very thin sleeve of Monel® or Inconel®. Other materials may be used as appropriate so long as they are magnetically permeable in applications such as an electric motor or generator which require coupling across the gap 24. This requirement, of course, does not necessarily apply to film dividers 34 in application to other rotating machinery which do not require a coupling of magnetic flux across the gap 24. Use of such film dividers 34 in such applications are within the scope of this invention. In applications such as electrical motors and generators, however, it is appropriate for the film divider 34 to be electrically insulative or at least of low electrical conductivity. This precludes or lessens eddy current losses within the film divider 34 which may affect the efficiency and heating of the machine 40 or fluid in the gap 24. As stated above, for applications not involving magnetic coupling across the gap 24, this requirement need not be met.

Figure 4:
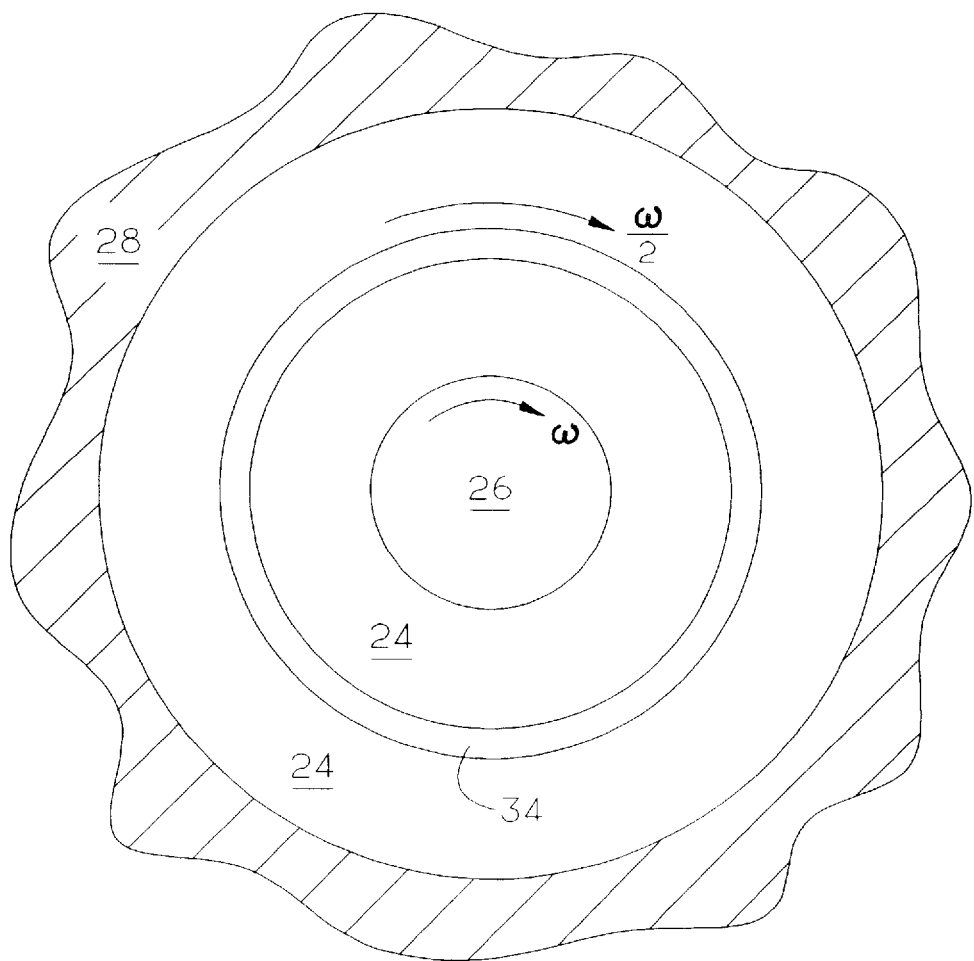
FIG. 4 is an end view of the embodiment of the instant invention illustrated in FIG. 3 illustrating the rotational vectors of its constituent parts.

During operation of the machine 40 of the instant invention, the rotor 26 rotates with an angular velocity of $\omega$ as illustrated in FIG. 4. As the rotor 26 spins, the fluid in the gap 24 causes the film divider 34, which is freely rotatable within the gap 24, to spin. Ideally, the angular velocity of the film divider 34 is $\omega/2$, being one-half of the relative angular velocity difference between the rotor 26 outer periphery 42 and the stator 28 inner periphery 44. The angular velocity of the film divider 34 will vary as the radial position of the film divider 34 within the gap 24. Ideally, the film divider will be positioned equidistant from the rotor 26 outer periphery 42 and the stator 28 inner periphery 44, although an advantage will be realized under a range of positions especially if the fluid conditions are not equivalent in both annuli. While not shown in FIG. 4, the instant invention contemplates the use of multiple film dividers in the gap 24. The number of film dividers 34 are limited by the electromagnetic losses and complexity acceptable within a particular system application.

Figure 2:
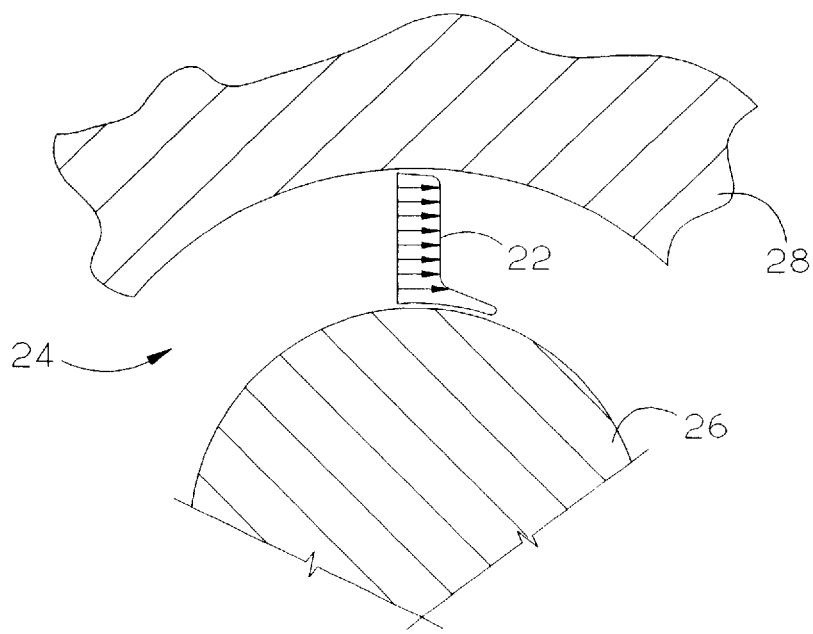
FIG. 2 is a vector flow diagram illustrating the fluid vectors across the gap between a rotor and a stator of a machine built in accordance with the teachings of the prior art.
Figure 5:
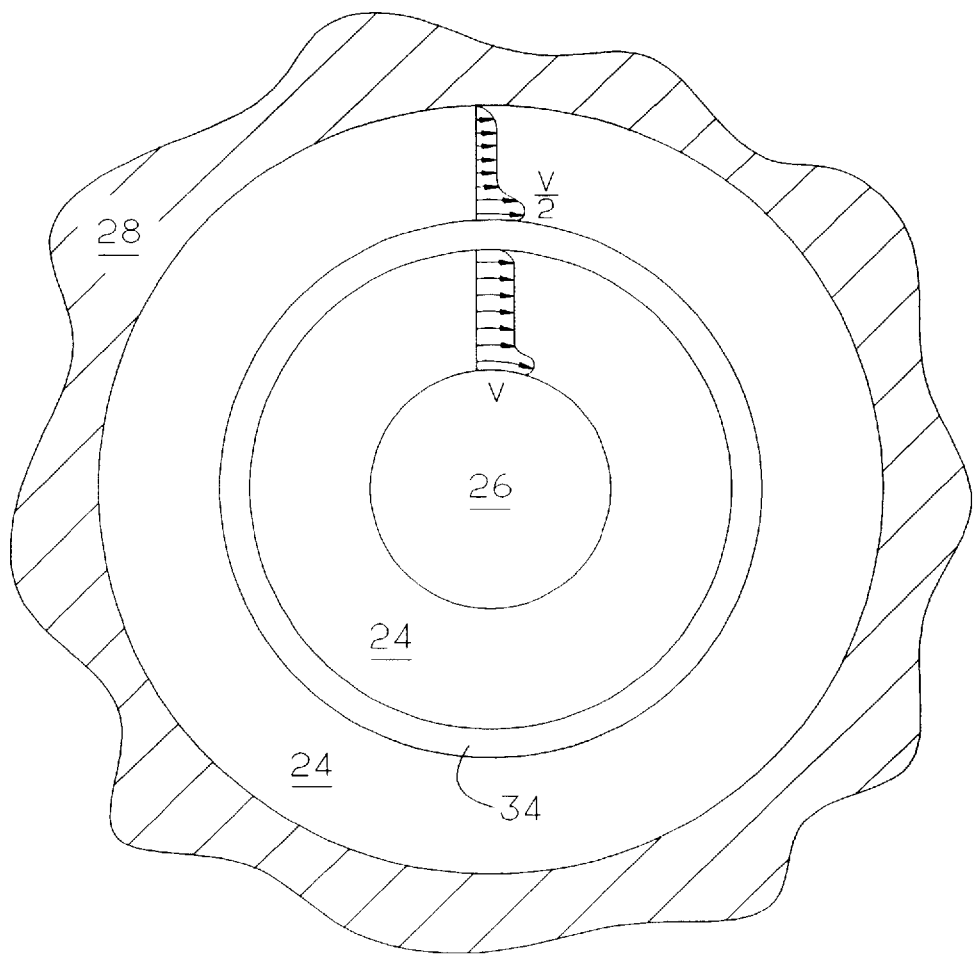
FIG. 5 is a vector flow diagram illustrating the fluid vectors across the gap between a rotor and a stator of a machine built in accordance with the teachings of the instant invention.
Figure 6:
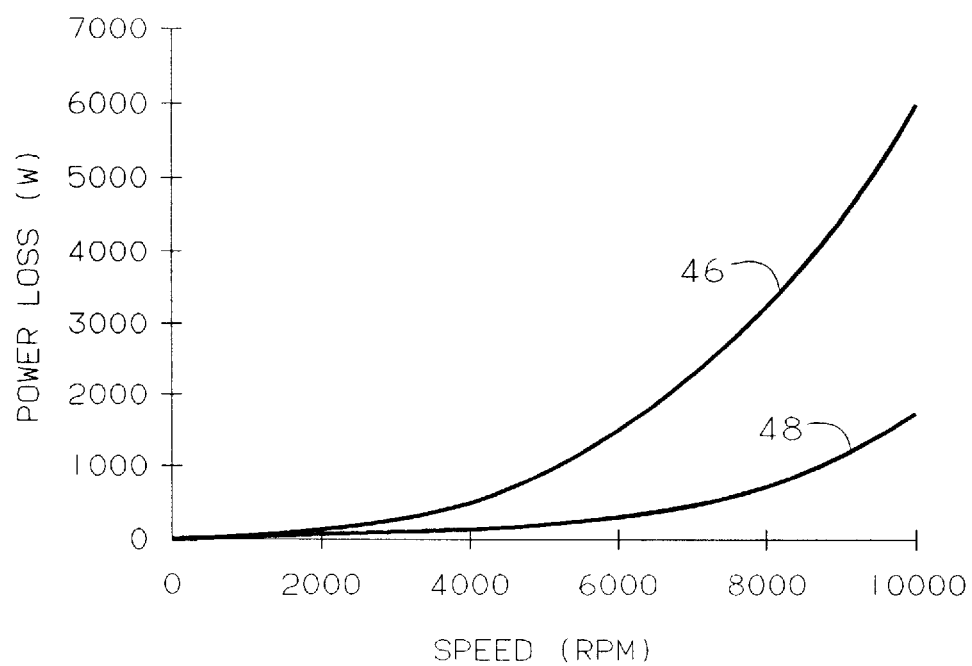
FIG. 6 is a graphical illustration of the power loss due to windage versus the speed of a machine built in accordance with the teachings of the instant invention.

FIG. 5 illustrates the vector flow of the fluid across the gap 24 with the film divider 34 in place. As may be seen by a comparison with FIG. 2, the differential vectors for each half of the gap 24 is half of the vector flow without the film divider. Since windage loss varies with relative velocity difference to the 2.7 power in the turbulent flow regime (i.e., $P \alpha \Delta\omega^{2.7}$), the overall system windage losses are lower with the film divider 34 in place. As a simplified numerical example to illustrate this principle, if the speed of the rotor 26 is picked as $\omega=10$, the speed differential is $\Delta\omega=10$ without the film divider 34. Using the above relationship, the power loss $P \alpha(10)^{2.7}=501$. However, with the film divider 34, the speed differential between the rotor 26 and the film divider 34 is $\Delta\omega=5$, and the speed differential between the film divider 34 and the stator 28 is $\Delta\omega=5$. The total windage power loss of the machine is the sum of the two losses, or $P\alpha(5)^{2.7}+P\alpha(5)^{2.7}=77+77=154$. Clearly, a reduction from 501 to 154 is of significant advantage. FIG. 6 illustrates this advantage graphically. Trace 46 is the windage power loss curve versus rotor speed for a machine constructed without the film divider 34 of the instant invention. Trace 48 is the windage power loss curve versus rotor speed for a machine constructed in accordance with the teachings of the instant invention. As is readily apparent from a casual purview of FIG. 6, the advantage of the instant invention increases with the speed of the rotor.

Figure 7:
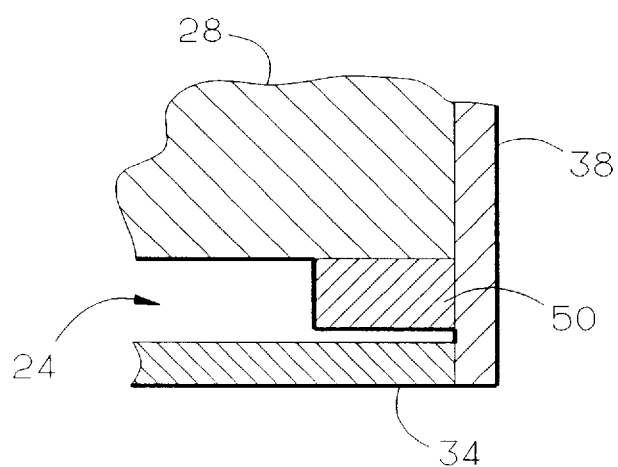
FIG. 7 is a partial view cross section of an embodiment of the instant invention illustrating the use of a radial bearing.
Figure 8:
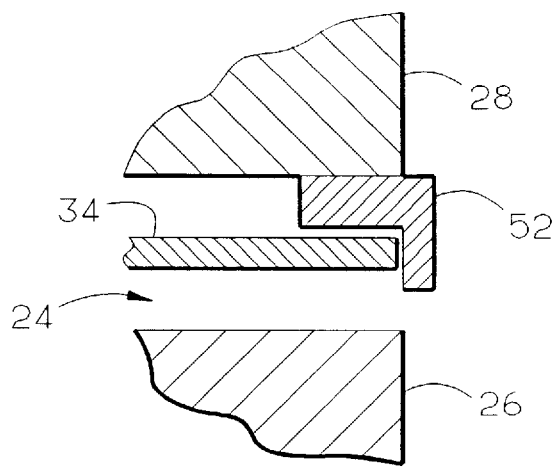
FIG. 8 is a partial view cross section of an embodiment of the instant invention illustrating the use of a combined axial and radial bearing constraint.
Figure 9:
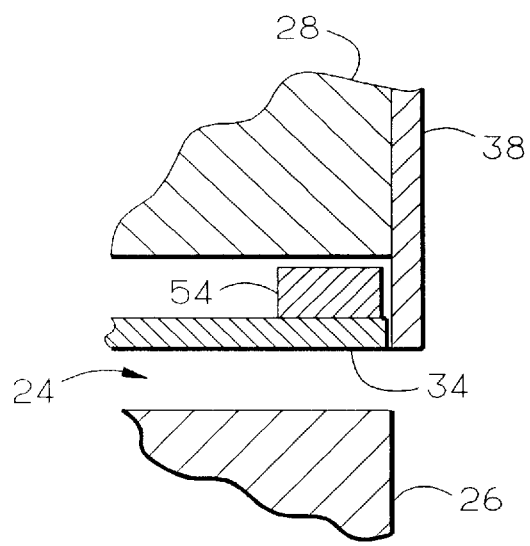
FIG. 9 is a partial view cross section of an embodiment of the instant invention illustrating the use of a radial hoop attached to the film divider of the instant invention.
Figure 10:
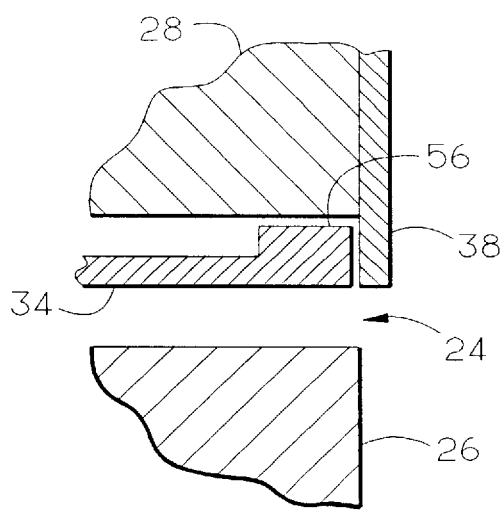
FIG. 10 is a partial view cross section of an embodiment of the instant invention illustrating an integral radial standoff feature of the film divider of the instant invention.

While the embodiment of FIG. 3 relies on the hydrodynamic floating journal bearing action of the fluid in the gap 24 to maintain the radial position of the film divider 34, an alternate embodiment of the invention contemplates the use of means for providing radial support for the film divider. An embodiment of such radial support means to maintain concentricity of the film divider 34 is illustrated in partial cutaway in FIG. 7 as a radial journal bearing 50. An alternate embodiment of the instant invention, as illustrated in FIG. 8, utilizes an integral radial/axial support 52 to both maintain radial concentricity and axial positioning within the gap 24. The alternate embodiment illustrated in FIG. 9 includes an enlarged journal which is a hoop 54 that is pressed onto the film divider 34. Alternatively, the enlarged journal may be integral 56 to the film divider 34. In each of the above alternate embodiments, the journal and bearing materials may be composite or metallic (bronze, steel, etc.) as is appropriate in the given application.

Figure 11:
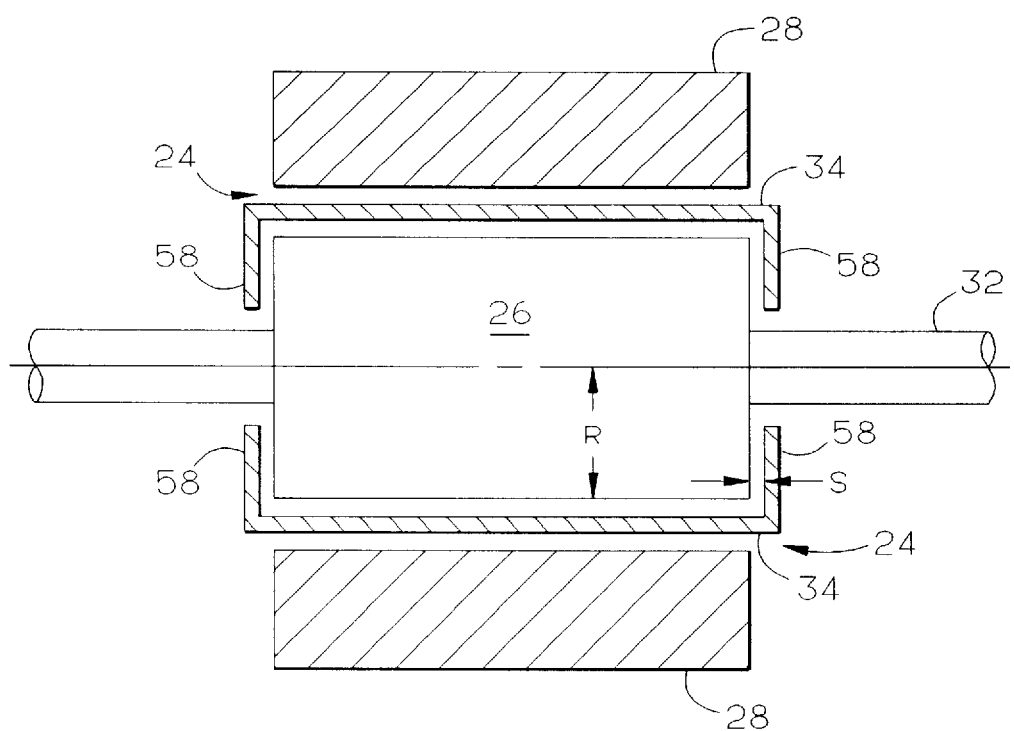
FIG. 11 is a cross section diagram of an embodiment of the instant invention illustrating axial retainers integrated with the film divider of the instant invention.

In addition to the various radial retention means within the scope of the invention, alternate axial retention means are within the scope of the invention as well. FIG. 11 illustrates one such alternate axial retention means, end disks 58 which may extend inwardly toward the rotor, as illustrated in FIG. 11, or outwardly toward the stator (not shown). As shown in FIG. 11, however, the power loss varies with the ratio of the distance from the rotor 26 to the end disk 58 S and the radius of the rotor 26 R as illustrated by trace 60 of FIG. 12. As may be seen, optimum reduction of power loss occurs when the ratio S/R is in the range of 0.01 to 0.1. As may be perceived from this graph, the configuration of FIG. 11 especially benefits large diameter machines, reducing disk windage losses as explained above. An alternate embodiment of the instant invention, as illustrated in FIG. 13, includes an end cap 62 which is pressed on the film divider 34. This end cap 62 may alternately be welded onto the film divider 34, as may the end disk 58 of FIG. 11, especially if the material used is Monel®, and the electrical frequency (and thus the eddy current losses) is low. With either of these embodiments, the use of radial fins or standoff 64 may be employed as illustrated in FIG. 14.

Figure 15:
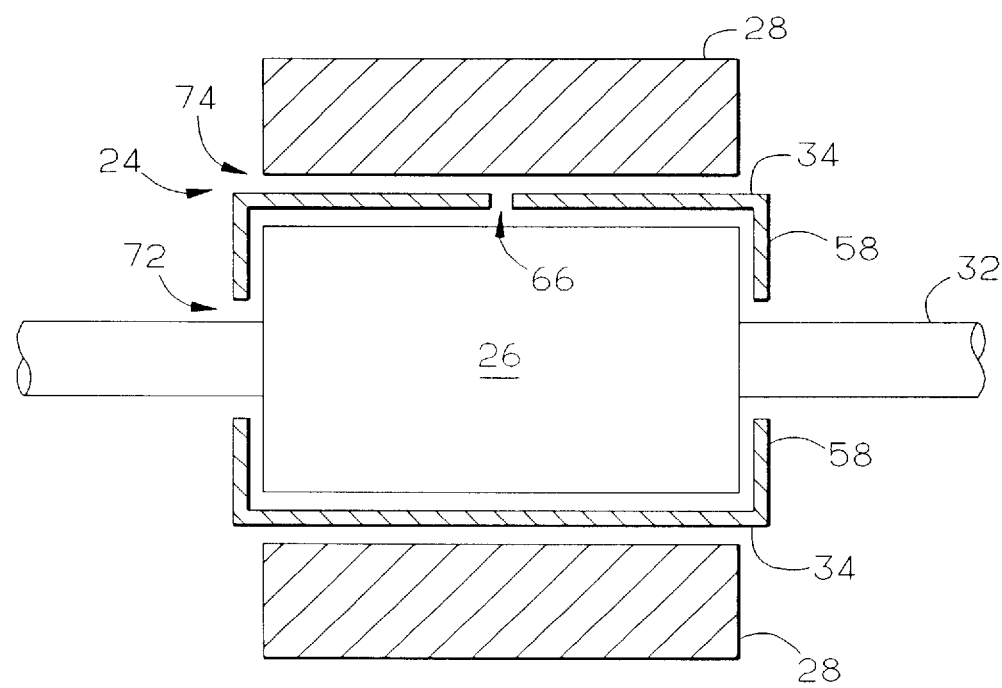
FIG. 15 is a cross section diagram of an embodiment of the instant invention illustrating circulation holes in the film divider.
Figure 16:
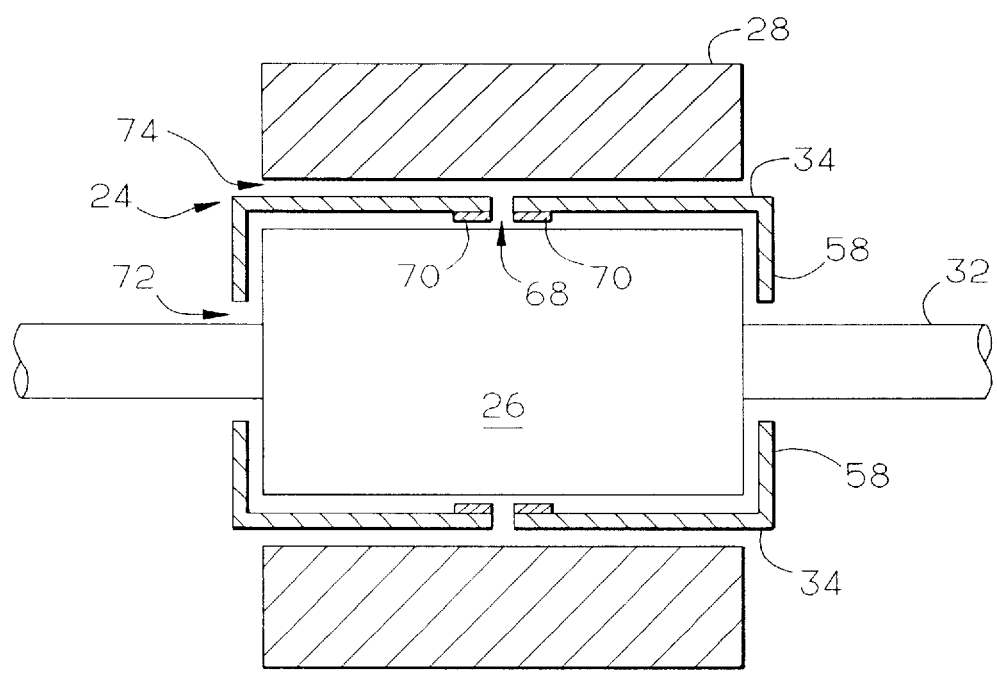
FIG. 16 is a cross section diagram of an embodiment of the instant invention illustrating a split in the centerline of the film divider to aid fluid circulation.

In applications where an axial flow of fluid is not imposed through the gap 24, fluid temperatures in the gap 24 may become excessive due to windage and electromagnetic heat loads. To promote fluid circulation through the gap 24, a hole 66 or a plurality of holes placed equidistant about the periphery of the film divider 34 along an axial midline may be added as illustrated in FIG. 15. With this configuration, fluid flows in via the inner annulus 72 and out via the outer annulus 74. The use of these holes taken to their natural limit results in the embodiment of FIG. 16 which includes, not a plurality of holes, but a slit 68 along the axial midline of the film divider 34. In fact, this slit 68 results in the film divider 34 to be divided in half. To maintain concentricity of this embodiment it may be advantageous to utilize radial bearings 70.

Figure 17:
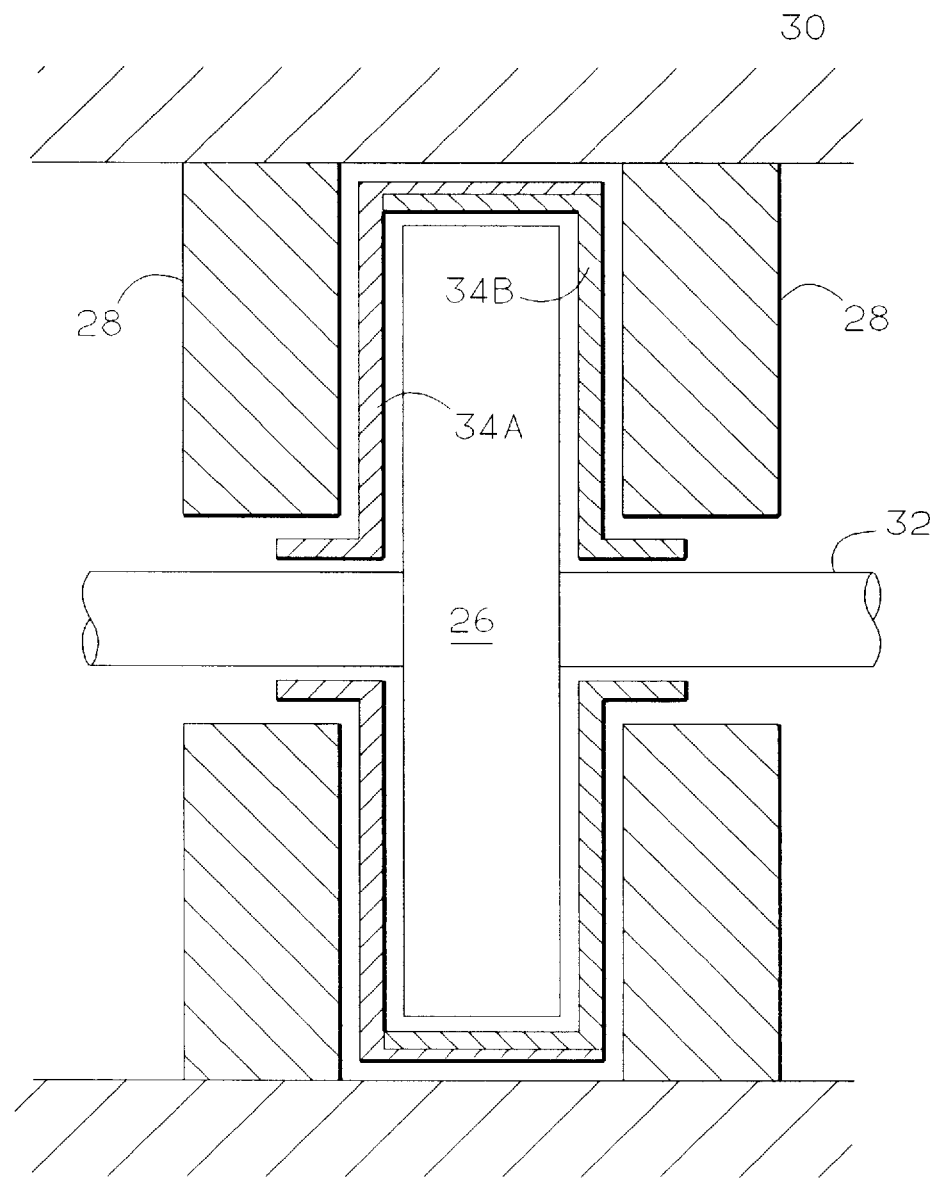
FIG. 17 is a cross section diagram of an embodiment of the instant invention illustrating the use of the film divider of the instant invention with an axial gap machine.
Figure 18:
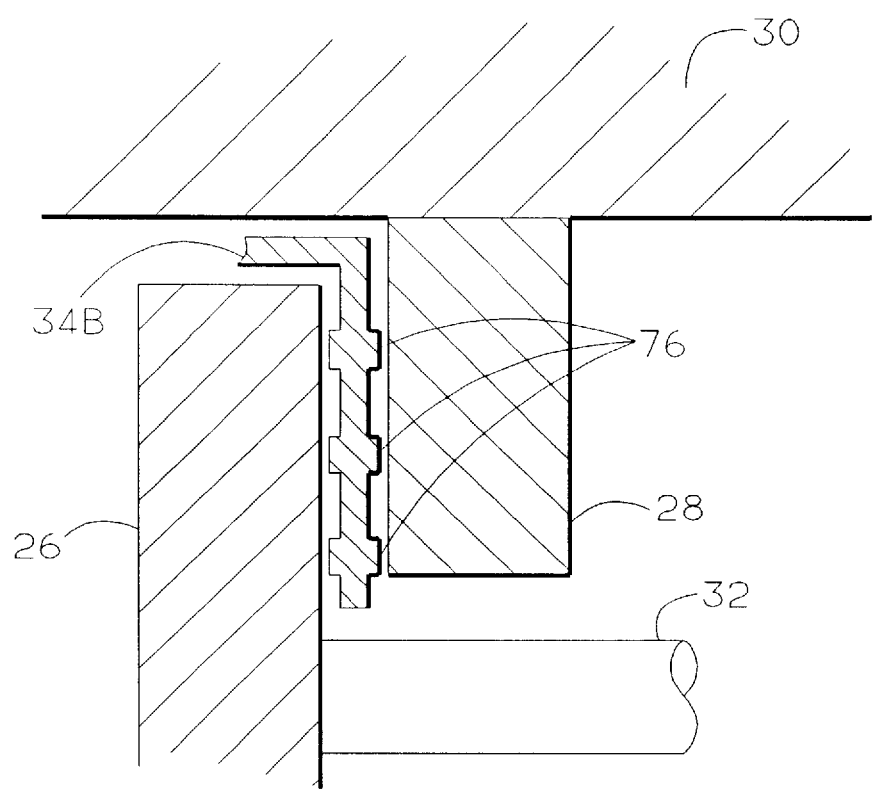
FIG. 18 is a partial cross section diagram of an embodiment of the instant invention illustrating the use of ring protuberances.

FIG. 17 illustrates an alternated embodiment of the instant invention utilizing an axial gap configuration. For this embodiment the film divider is divided into two mating sections 34A and 34B which may be pressed together or bonded. The outer diameter of section 34A forms the journal for holding the film divider concentric. Alternatively, a bearing (not shown) could be used as described above. This concept may also be applied equally well to thrust bearings. To minimize pumping losses, ring protuberances 76 may be added to the film divider sections 34A and 34B to minimize radially outward flow as illustrated in FIG. 18.

As is now apparent from the foregoing description, the method of the instant invention to reduce windage loss in a flood cooled rotating machine 40 which has a stator 28 and a rotor 26 and a gap 24 therebetween comprises the steps of placing a film divider 34 in the gap 24 between the rotor 26 and the stator 28 and allowing the film divider 34 to freely rotate within the gap 24 during operation of the machine 40.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An apparatus, comprising:
a stator having an inner periphery;
a rotor rotatably positioned within said stator, said rotor having an outer periphery, said outer periphery and said inner periphery defining a cylindrical gap therebetween; and
an annular film divider having openings at both ends positioned within said cylindrical gap wherein the film divider is freely rotatable with respect to the stator and the rotor.

2. The apparatus of claim 1, wherein said gap is filled with fluid.

3. The apparatus of claim 2, wherein said rotor rotates at a steady state speed $\omega$, and wherein said film divider comprises a sleeve substantially equidistant from the stator and the rotor whereby the film divider is caused to rotate at a steady state speed of approximately $\omega/2$ thereby.

4. The apparatus of claim 3, wherein said sleeve is maintained at a radial position by hydrodynamic forces.

5. The apparatus of claim 3, further comprising
at least one hoop fixably attached to an outer surface of said film divider.

6. The apparatus of claim 3, wherein said film divider comprises means integral with said film divider for maintaining a radial position within said gap.

7. The apparatus of claim 1, further comprising an axial constraint positioned at either end of said rotor and said stator, said axial constraint maintaining said film divider substantially within said gap.

8. The apparatus of claim 7, further comprising a housing, and wherein said axial constraint is formed integrally within said housing.

9. The apparatus of claim 1, wherein said film divider extends axially beyond said rotor and said stator, said film divider including at least one axial constraint, said at least one axial constraint maintaining said film divider substantially within said gap.

10. The apparatus of claim 2, wherein said film divider defines a plurality of holes along a midline, said holes facilitating a flow of fluid through said gap.

11. An apparatus, comprising:
a stator having an inner periphery;
a rotor rotatably positioned within said stator, said rotor having an outer periphery, said outer periphery and said inner periphery defining a gap therebetween wherein the gap is filled with fluid; and
a film divider rotatably positioned within said gap;
wherein said rotor rotates at a steady state speed $\omega$, and wherein said film divider is caused to rotate at a steady state speed of approximately $\omega/2$ thereby; and
a radial bearing positioned between said inner periphery and said film divider, said radial bearing maintaining a radial position of said film divider.

12. An apparatus, comprising:
a stator having an inner periphery;
a rotor rotatably positioned within said stator, said rotor having an outer periphery, said outer periphery and said inner periphery defining a gap therebetween; and
a film divider rotatably positioned within said gap; and
an axial constraint positioned at either end of said rotor and said stator, said axial constraint maintaining said film divider substantially within said gap and wherein said axial constraint comprises a disk mounted on said stator.

13. An apparatus, comprising:
a stator having an inner periphery;
a rotor rotatably positioned within said stator, said rotor having an outer periphery, said outer periphery and said inner periphery defining a gap therebetween; and
a film divider rotatably positioned within said gap wherein said film divider extends axially beyond said rotor and said stator, said film divider including at least one axial constraint, said at least one axial constraint maintaining said film divider substantially within said gap and wherein said at least one axial constraint includes a plurality of radial fins, said radial fins accommodating a flow of fluid in said gap.

14. An apparatus, comprising:
a stator having an inner periphery;
a rotor rotatably positioned within said stator, said rotor having an outer periphery, said outer periphery and said inner periphery defining a gap therebetween; and
a film divider rotatably positioned within said gap wherein said film divider extends axially beyond said rotor and said stator, said film divider including at least one axial constraint, said at least one axial constraint maintaining said film divider substantially within said gap and wherein said at least one axial constraint includes a plurality of radial fins, said radial fins accommodating a flow of fluid in said gap.

15. An apparatus, comprising:
a stator having an inner periphery;
a rotor rotatably positioned within said stator, said rotor having an outer periphery, said outer periphery and said inner periphery defining a gap therebetween wherein the gap is filled with fluid; and
a film divider rotatably positioned within said gap wherein said film divider comprises a first and a second half, each of said halves comprising a cylindrical portion and an end disk portion, said cylindrical portion of each half being positioned within said gap from either end of said rotor and said stator and extending axially into said gap less than half of said total axial length of said rotor defining a slit therebetween, each of said disk portions defining a fluid passage therein, and wherein said slit and said fluid passages facilitating a flow of fluid through said gap.

16. A method of reducing windage loss in a flood cooled rotating machine having a stator and a cylindrical rotor defining an annular gap therebetween, the method comprising the steps of:
A) placing a film divider comprising a cylindrical sleeve in the gap between the rotor and the stator, said cylindrical sleeve having openings at both ends; and
B) allowing the film divider to freely rotate within the gap during operation of the machine.

17. A flood cooled electric motor/generator, comprising:
a housing;
a stator mounted within said housing, said stator having a cylindrical inner periphery defining an opening therethrough;
a rotor rotatably mounted within said stator, said rotor having a cylindrical outer periphery of radius R, said outer periphery and said inner periphery defining an annular gap therebetween of width D; and
an annular film divider of approximate radius (R+D/2) positioned within said gap, said film divider having openings at both ends.

18. The motor/generator of claim 17, wherein said rotor rotates at a given speed ω, and wherein said film divider comprises a sleeve substantially equidistant from the stator and the rotor whereby said rotation of said rotor results in a rotation of said film divider at an induced speed of approximately ω/2.

19. The motor/generator of claim 18, further comprising first means interposed between said inner periphery and said film divider for maintaining a radial position of said film divider within said gap.

20. The motor/generator of claim 19, wherein said first means comprises a hydrodynamic bearing created by said rotation of said rotor.

21. The motor/generator of claim 19, wherein said means comprises at least one hoop fixably attached to an outer surface of said film divider.

22. The motor/generator of claim 19, wherein said first means are integral with said film divider.

23. A flood cooled electric motor/generator, comprising:
a housing;
a stator mounted within said housing, said stator having an inner periphery defining an opening therethrough;
a rotor rotatably mounted within said stator, said rotor having an outer periphery of radius R, said outer periphery and said inner periphery defining a gap therebetween of width D;
a film divider of approximate radius (R+D/2) positioned within said gap wherein said rotor rotates at a given speed ω, said rotation resulting in a rotation of said film divider at an induced speed of approximately ω/2; and
means interposed between said inner periphery and said film divider for maintaining a radial position of said film divider within said gap wherein said means comprises at least one radial bearing.

24. The motor/generator of claim 19, further comprising second means for maintaining an axial position of said film divider within said gap.

25. A flood cooled electric motor/generator, comprising:
a housing;
a stator mounted within said housing, said stator having an inner periphery defining an opening therethrough;
a rotor rotatably mounted within said stator, said rotor having an outer periphery of radius R, said outer periphery and said inner periphery defining a gap therebetween of width D;
a film divider of approximate radius (R+D/2) positioned within said gap wherein said rotor rotates at a given speed ω, said rotation resulting in a rotation of said film divider at an induced speed of approximately ω/2;
first means interposed between said outer periphery and said film divider for maintaining a radial position of said film divider within said gap; and
second means for maintaining an axial position of said film divider within said gap wherein said second means comprises an axial constraint positioned at either end of said rotor and said stator and extending radially inwardly across said gap.

26. A flood cooled electric motor/generator, comprising:
a housing;
a stator mounted within said housing, said stator having an inner periphery defining an opening therethrough;
a rotor rotatably mounted within said stator, said rotor having an outer periphery of radius R, said outer periphery and said inner periphery defining a gap therebetween of width D;

a film divider of approximate radius (R+D/2) positioned within said gap wherein said rotor rotates at a given speed ω, said rotation resulting in a rotation of said film divider at an induced speed of approximately ω/2;

first means interposed between said outer periphery and said film divider for maintaining a radial position of said film divider within said gap; and second means for maintaining an axial position of said film divider within said gap wherein said second means is formed integrally within said housing.

27. A flood cooled electric motor/generator, comprising:

a housing;

a stator mounted within said housing, said stator having an inner periphery defining an opening therethrough;

a rotor rotatably mounted within said stator, said rotor having an outer periphery of radius R, said outer periphery and said inner periphery defining a gap therebetween of width D;

a film divider of approximate radius (R+D/2) positioned within said gap wherein said rotor rotates at a given speed ω, said rotation resulting in a rotation of said film divider at an induced speed of approximately ω/2;

first means interposed between said outer periphery and said film divider for maintaining a radial position of said film divider within said gap; and second means for maintaining an axial position of said film divider within said gap wherein said second means comprises a disk mounted on said stator, said disk having a radius extending radially inwardly across said gap.

28. A flood cooled electric motor/generator, comprising:

a housing;

a stator mounted within said housing, said stator having an inner periphery defining an opening therethrough;

a rotor rotatable mounted within said stator, said rotor having an outer periphery of radius R, said outer periphery and said inner periphery defining a gap therebetween of width D;

a film divider of approximate radius (R+D/2) positioned within said gap wherein said rotor rotates at a given speed ω, said rotation resulting in a rotation of said film divider at an induced speed of approximately ω/2; and means interposed between said outer periphery and said film divider for maintaining a radial position of said film divider within said gap;

wherein said film divider extends axially beyond said rotor and said stator, said film divider including at least one axial constraint, said at least one axial constraint maintaining said film divider substantially within said gap.

29. The motor/generator of claim 28, wherein said at least one axial constraint includes a plurality of radial fins, said radial fins accommodating a flow of fluid in said gap.

30. The motor/generator of claim 28, wherein said film divider extends axially beyond said rotor and said stator by a length S, and wherein a relationship between said length S and said radius of said rotor R such that S/R is in the range of 0.01 to 0.1.

* * * * *